United States Patent
McCalmont et al.

(10) Patent No.: US 6,771,742 B2
(45) Date of Patent: Aug. 3, 2004

(54) GEOGRAPHIC ROUTING OF EMERGENCY SERVICE CALL CENTER EMERGENCY CALLS

(75) Inventors: Patti L. McCalmont, Oswego, IL (US); Robert A. Sherry, Aurora, IL (US); Ronald W. Mathis, Houston, TX (US); Peter R. Schmidt, Westminster, CO (US)

(73) Assignee: Intrado Inc., Longmont, CO (US)

( * ) Notice: Subject to any disclaimer, the term of this patent is extended or adjusted under 35 U.S.C. 154(b) by 0 days.

(21) Appl. No.: 10/277,438

(22) Filed: Oct. 21, 2002

(65) Prior Publication Data

US 2003/0086539 A1 May 8, 2003

Related U.S. Application Data

(60) Provisional application No. 60/332,630, filed on Nov. 5, 2001.

(51) Int. Cl.⁷ ............................................. H04M 11/04
(52) U.S. Cl. ............................. 379/45; 379/37; 379/42
(58) Field of Search ........................ 379/37–45, 216.01; 455/556.1; 370/352

(56) References Cited

U.S. PATENT DOCUMENTS

| | | | |
|---|---|---|---|
| 4,310,726 A | 1/1982 | Asmuth | 179/18 |
| 5,311,569 A | 5/1994 | Brozovich et al. | 379/45 |
| 5,646,987 A | 7/1997 | Gerber et al. | 379/265 |
| 5,797,093 A | 8/1998 | Houde | 455/404 |
| 5,937,355 A | 8/1999 | Joong et al. | 455/466 |
| 5,946,618 A | 8/1999 | Agre et al. | 455/428 |
| 6,038,440 A | 3/2000 | Wu | 455/440 |
| 6,064,722 A | 5/2000 | Clise et al. | 379/37 |
| 6,067,356 A | 5/2000 | Lautenschlager et al. | 379/207 |
| 6,073,004 A | 6/2000 | Balachandran | 455/404 |
| 6,073,005 A | 6/2000 | Raith et al. | 455/404 |
| 6,078,804 A | 6/2000 | Alperovich et al. | 455/404 |
| 6,101,240 A | 8/2000 | Blair et al. | 379/45 |
| 6,104,784 A | 8/2000 | Robbins | 379/45 |
| 6,115,596 A | 9/2000 | Raith et al. | 455/404 |
| 6,128,481 A | 10/2000 | Houde et al. | 455/404 |
| 6,148,190 A | 11/2000 | Bugnon et al. | 455/404 |
| 6,215,865 B1 | 4/2001 | McCalmont | 379/212 |
| 6,233,445 B1 | 5/2001 | Boltz et al. | 455/404 |
| 6,249,252 B1 | 6/2001 | Dupray | 342/450 |
| 6,252,943 B1 | 6/2001 | Johnson et al. | 379/45 |
| 6,292,542 B1 | 9/2001 | Bilder | 379/45 |
| 6,332,073 B1 | 12/2001 | Nilsson et al. | 455/404 |
| 6,356,751 B1 | 3/2002 | Valentine et al. | 455/404 |
| 6,397,054 B1 | 5/2002 | Hoirup et al. | 455/404 |
| 6,415,018 B1 | 7/2002 | Antonucci et al. | 379/45 |
| 6,466,651 B1 | 10/2002 | Dailey | 379/37 |
| 6,466,788 B1 | 10/2002 | Carlsson | 455/435 |

*Primary Examiner*—Melur Ramakrishnaiah
(74) *Attorney, Agent, or Firm*—Sheridan Ross P.C.

(57) ABSTRACT

The present invention is related to the delivery of requests for emergency service initially handled by an emergency service call center to a public safety answering point. The invention additionally allows for enhancement information to be provided to a public safety answering point operator visually in connection with calls routed to that public safety answering point. This information may include caller identification, and additional information, such as information regarding the location of the caller and the nature of the emergency. Furthermore, the routing of requests for emergency service to an appropriate public safety answering point can be accomplished for requests received over a wide geographic area. In particular, requests can be appropriately routed even though they may originate from locations encompassed by different E9-1-1 tandems. The present invention is particularly well suited for use in connection with automatic collision notification and personal alarm monitoring call centers serving areas encompassed by more than one E9-1-1 tandem.

15 Claims, 6 Drawing Sheets

GEOGRAPHIC ROUTING OF EMERGENCY SERVICE CALL CENTER EMERGENCY CALLS

CROSS REFERENCE TO RELATED APPLICATIONS

Priority is claimed from U.S. Provisional Patent Application Serial No. 60/332,630, filed Nov. 5, 2001, entitled "GEOGRAPHIC ROUTING OF EMERGENCY SERVICE CALL CENTER EMERGENCY CALLS," which is incorporated by reference herein in its entirety.

FIELD OF THE INVENTION

This invention relates to emergency telephone services (9-1-1 services). In particular, the present invention relates to the routing of emergency services calls from call centers to public safety answering points, and to the provision of data in connection with such calls.

BACKGROUND OF THE INVENTION

Abbreviated number systems have been provided as part of the public switched telephone network to provide callers with a convenient, easily remembered number that can be used to access important services. Most prominently, the 9-1-1 system in the United States was developed for handling emergency service calls. Abbreviated number systems similar to the 9-1-1 system in use in the United States are in place in other countries for handling emergency service calls. The abbreviated number system established in Canada is the foreign system most similar to the system established in the United States. In addition, there are other abbreviated number calling systems in place in the United States and other countries for such purposes as handling municipal information and services calls (3-1-1). All of these special, or abbreviated number call systems that have geographic-based content suffer from similar shortcomings in their abilities to automatically place incoming calls to an action-response facility geographically proximate to the locus of the caller. In particular, calls must originate from within the serving area of telephone company switching equipment interconnected to the appropriate public safety answering point. Accordingly, calls handled through intermediary service providers, such as alarm companies and telematics service providers cannot benefit from the automated routing and information delivery features available in connection with many conventional abbreviated number systems.

In a basic emergency services notification and dispatch system (or 9-1-1 system), a telephone company end office (also known as a "central office" or a "Class 5 office") is programmed to route all emergency calls (e.g., all 9-1-1 calls) to a single destination. The single destination is termed a public safety answering point (PSAP). In such an arrangement, all telephones served by the central office have their 9-1-1 calls completed to the PSAP. However, the areas served by respective telephone company central offices usually do not line up with the political jurisdictions that determine the boundaries for which a PSAP may be responsible. That is, a municipal fire department or police department may geographically include an area outside the area served by the central office, a condition known as underlap. Likewise, the municipal fire or police department may encompass an area of responsibility that is less expansive than the area served by the central office, a situation known as overlap. Further, the original basic 9-1-1 systems did not provide any identification of the caller. Accordingly, the PSAP human operator must obtain such information verbally over the line after the call is connected. In addition, basic 9-1-1 systems cannot support interconnection to other telecommunication providers such as independent telephone service companies, alternate local exchange carriers (ALECs), or wireless carriers.

Automatic number identification (ANI) is a feature for 9-1-1 services that was developed to allow the caller's telephone number to be delivered with the call and displayed at the PSAP. This feature is useful for identifying the caller and, if the caller cannot communicate, for callback. Using subscriber information stored by telephone companies based upon telephone number, the caller's name and address can be provided as well as part of automatic location identification (ALI) databases. In particular, the PSAP can query the ALI database using the caller's number provided by the ANI feature to ascertain name and address information. However, such systems are ineffective where several telephone company central offices serve a PSAP.

In order to handle the situation of multiple central offices serving a single PSAP, the 9-1-1 tandem was developed. The tandem is a telephone company switch that provides an intermediate concentration and switching point. In particular, trunks from central offices are concentrated at a tandem office (a 9-1-1 tandem) from which a single trunk group serves a given PSAP. Often a 9-1-1 tandem comprises an otherwise common Class 5 telephone system end office (EO), with added software to configure it for 9-1-1 operations. Such concentration of trunks reduces the size and cost of PSAP equipment.

More recently, enhanced 9-1-1 (E9-1-1) has become available. Some of the features of E9-1-1 include selective routing, ANI, ALI, selective transfer and fixed transfer. However, as with a basic 9-1-1 system, a 9-1-1 call must originate within the serving area of the E9-1-1 tandem.

It would be desirable to provide for the routing of requests for emergency services to an appropriate public safety answering point even if such requests are placed through central call centers. Such call centers include alarm monitoring centers, automatic collision notification centers, and other centers that may receive requests for emergency services that originate from a location that is removed from the location of the call center.

Alarm companies typically provide for monitoring of subscriber premises from a central monitoring station. In a typical alarm implementation, a security system communicator is placed in the home or business. When an alarm is detected, the communicator seizes the telephone line from the telephone instruments, dials a number in the alarm company monitoring station, transmits to the receiver in the monitoring station information regarding the client's account information and the alarm event, and releases the telephone line. The alarm company may then call the subscriber number to weed out false alarms. If a valid alarm is ascertained, the alarm company looks up the telephone number for the emergency service provider that serves the client's area and dials a 10 digit number to report the incident. The alarm company then verbally passes any information it has that may assist the call taker. In addition to stationary premises alarms, new types of personal alarms are being introduced that may be worn on the person and use wireless communications to alert the alarm company.

Automatic collision notification (ACN) centers receive calls placed from vehicles requiring assistance. For example, in the event of an accident, equipment in an automobile or an occupant of the automobile may call the ACN center using a wireless link, such as a cellular telephone system, rather than a public emergency service number, and pass information related to the accident to the ACN center. This data may be uploaded from a unit in the automobile to a database at the call center. The operator at the ACN center then attempts to determine the appropriate emergency service agency to respond to the request, and calls that agency using a 10 digit number. The operator verbally communicates any information he/she has about the caller's location and situation to the agency personnel. This scenario is complicated in that, like alarm monitoring centers, ACN call centers may handle calls from callers that may be located anywhere in the country or the world.

Another type of centralized call center may be associated with requests for emergency services originating from communication devices utilizing a voice over Internet protocol (VoIP) connection. An IP private branch exchange (PBX) typically serves this type of connection. The actual location of the caller is unknown at the time that a call is initiated. Accordingly, for proper routing of the VoIP phone connection, the location of the caller must be determined. Current solutions require a VoIP user to dial a special number for emergency service, which will connect them to an attendant at a third party emergency service provider call center that will in turn call the appropriate emergency service number. Dialing of 9-1-1 by the end users over these connections is not supported with the existing technology.

In each of the examples noted above, in order to determine the correct PSAP for such calls placed to a third party emergency service call center, operators must manually cross-reference the client's location or address with the appropriate PSAP. These calls are treated as anonymous calls and cannot receive the normal call treatment of a 9-1-1 call. In particular, because typical 9-1-1 treatment cannot be applied, there is no additional information, such as caller identification and location information, that can be provided to the PSAP automatically. There have been no solutions proposed for automatically routing calls requesting emergency services from third party emergency service call centers to an appropriate PSAP and for delivering data regarding such calls. In particular, the prior art examples do not provide sufficient flexibility to meet the needs of calls placed from an emergency services call center or other center serving a wide geographic area (i.e. a geographic area encompassing more than one E9-1-1 tandem).

SUMMARY OF THE INVENTION

This invention allows an emergency service call center (ESCC) to automatically route a call or request for emergency services to the correct public safety answering point (PSAP) and provide the PSAP with pertinent information (e.g., latitude and longitude, street address, vehicle collision data, etc.) related to the caller. In particular, the present invention provides an emergency services complex (ESC) that has a map of PSAP boundaries covering a large area. For example, the ESC may provide coverage for the entire United States.

In addition, an interface between a positioning server (PS) and a call center database (CCDB) that can pass call related client information to the PS and allow the PS to instruct the CCDB on how to route the call is provided. An interface between the PS and the automatic location identification (ALI) database is provided to allow the PSAP to query for pertinent customer information, and an interface between the PS and an information retrieval center (IRC) to allow for other authorized agencies to obtain pertinent data, or to push data to those IRCs, are also provided. In addition, the present invention allows the use of the public switched telephone network (PSTN) to deliver the emergency service calls received by an emergency service call center (ESCN) to an appropriate PSAP and to have the call treated as any other 9-1-1 call (i.e. as a native 9-1-1-call).

An embodiment of the present invention may be used by service providers operating an emergency service call center who need to transfer calls to emergency service agencies in order to get the appropriate emergency response teams dispatched. For example, one type of emergency service call center, a personal alarm monitoring (PAM) agency, may get an alarm that a client is in need of help through the activation of an alert unit on the person of the client or in the client's home or business. The PAM agency can call the appropriate PSAP without having to manually cross reference the PSAP that serves the client's area. The PAM agency can also pass relevant data about the client that can be displayed at the PSAP.

As a further example, a car crash may occur anywhere in the nation, and notification is transferred to a national automatic collision notification (ACN) call center, a type of emergency service call center provided in connection with telematics services. The national ACN call center may use this invention to automatically route the call to the appropriate PSAP. In addition, specific information about the car crash may be made available to the PSAP based upon the response to a query initiated by the PSAP.

As yet another example, a caller using a VoIP telephone system to initiate a request for emergency assistance may have the request routed to the appropriate PSAP using an embodiment of the present invention. For a VoIP connection, the location of the caller is critical for determining the appropriate PSAP for getting help to the caller. During authentication, which involves validating that the end user is a subscriber to the VoIP Service in question, or shortly thereafter, the location of the caller, which may include an actual address, is made available. The location information and any other data deemed necessary by the VoIP service provider populates a call center database (CCDB) maintained by the VoIP service provider. This is similar to the CCDB maintained by a telematics service provider. In addition, the original location (e.g., the street address) information is converted to a latitude and longitude location to determine the emergency service zone in which the caller is located.

For the call origination scenario, the ACN center, PAM center or VoIP service provider (or ESCC), may use a computer telephony integration (CTI) application where the call center database (CCDB) queries, across an interface provided in connection with an embodiment of the present invention, a positioning server (PS) system in an emergency services complex (ESC) node, passing the latitude, longitude and other relevant information related to the caller. The PS uses the latitude and longitude to query a coordinate routing database (CRDB), across an interface, to obtain the emergency service zone (ESZ) for the target PSAP. The PS contains two types of tables. The first type contains routing digits defined as emergency services routing numbers (ESRNs). The ESRNs can be used by the public switched telephone network (PSTN) to route the call to a terminating emergency communications network (ECN) switch or E9-1-1 tandem. The other type of table contains emergency services query keys (ESQKs). This key, which is unique for a given call, is used by the emergency services network to route the call to the appropriate PSAP and is used by the PSAP to query for incident information. From the ESZ received from the CRDB, the PS selects an ESRN and an ESQK. The ESC returns these to the CCDB. The ESCC then routes the call to the PSTN across a primary rate ISDN (PRI) interface using the ESQK as the calling party number and the ESRN as the called party number.

The PSTN routes the call across the network to a terminating switch. The first alternative uses an ECN switch. This switch may be a Class 5 switch provided by the incumbent local exchange carrier (ILEC), competitive local exchange carrier (CLEC) or a third party provider who owns the ECN switch. When the ECN switch receives the call it uses the ESRN to determine the appropriate E9-1-1 tandem, deletes the ESRN and adds 9-1-1 as the called party number, and forwards the call to the E9-1-1 tandem. The second alternative directly routes the call to the E9-1-1 tandem. Through translations on the E9-1-1 tandem, the ESRN is presented as an emergency number so processing of the call is treated as an emergency call. For both alternatives, the E9-1-1 tandem then processes the call as a normal 9-1-1 call using the ESQK as the caller's automatic number identification (ANI).

When the PSAP receives the call, it queries the automatic location identification (ALI) system with the ESQK. The ALI system recognizes that the ESQK is associated with the PS and queries the PS across an interface. The PS returns to the ALI pertinent information related to the caller (latitude and longitude, address, crash information, etc.) The ALI returns this information to the PSAP to allow the PSAP to display the information to the PSAP operator.

For a call conference scenario where an ACN, PAM, or other VoIP call center operator is in voice communication with the calling or originating party, position information is transferred to the CCDB and the operator at the call center may press a single call conference button to activate a call to the PSAP. Using a CTI application, the CCDB queries the PS as discussed above. The ACN call center then makes a 3-way call across the PSTN. From this point the call flow is as discussed above.

Once the data is available at the PS, other Information retrieval centers (IRC) may require access to the data, e.g., a trauma center, the department of transportation, etc. An interface between the PS and IRC provided by the present invention allows pertinent information to be provided to the IRC in a format required by those IRCs, or the PS could push the pertinent data to the IRC, allowing for immediate notification.

DETAILED DESCRIPTION

The present invention relates to the routing of calls or requests for emergency services received at an emergency service call center to an appropriate public safety answering point across the public switched telephone network as native emergency calls. In addition, the present invention relates to the provision of caller information in connection with emergency calls that are placed to an emergency service call center and routed to a public safety answering point over the public switched telephone network.

Figure 1:
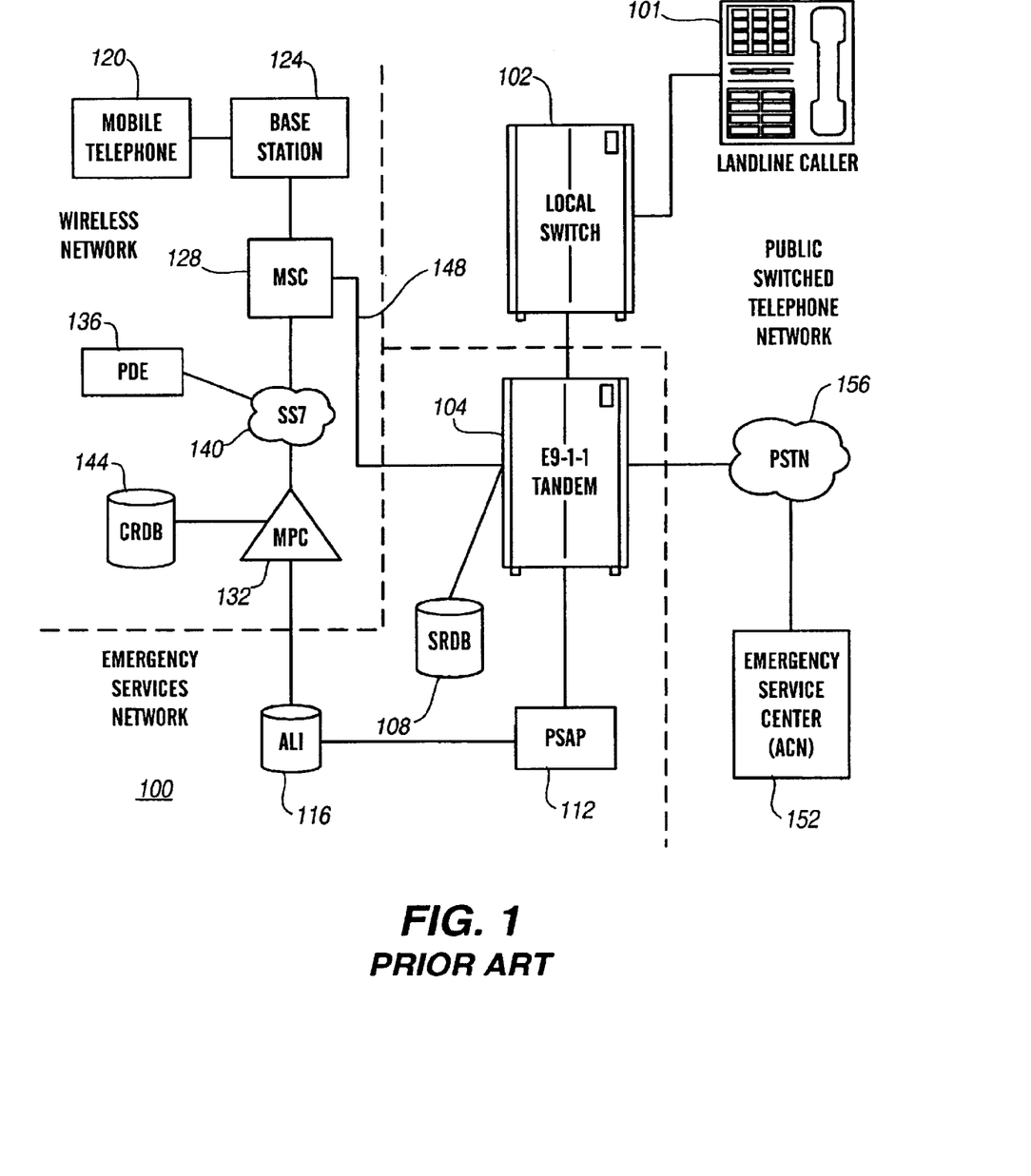
FIG. 1 depicts a prior art network for delivering wireline and wireless calls to a public safety answering point.

With reference now to FIG. 1, in a prior art system 100, 9-1-1 calls placed from a wireline telephone 101 are routed by a local switch 102 and delivered within a specific geographic area, and in particular within the serving area for an E9-1-1 tandem 104. Routing is done based on static tables that correlate a street address associated with the telephone 101 to an emergency service number (ESN) that translates to a specific PSAP. In particular, a house or other static address within the serving area for the E9-1-1 tandem 104 is translated into map coordinates, and selective routing databases 108 may use this information to select an ESN. This type of routing is only possible within the serving area of an E9-1-1 tandem. In particular, there is no prior art method that has been contemplated that would route emergency service calls over a wide geographic area and preserve 9-1-1 treatment (e.g., pass ANI, perform selective routing, allow for selective transfer, etc.). More particularly, conventional systems are not capable of routing emergency service calls over an area encompassing multiple E9-1-1 tandems. Accordingly, conventional systems, like the system 100 illustrated in FIG. 1, are not capable of routing emergency service requests from a central call center to an appropriate PSAP. In addition, data retrieval of customer information by the PSAP 112 associated with the selected ESN is provided by static tables within the ALI database 116. In service areas that abut, one carrier may query another carrier's ALI system for data, but the resulting data is still static data originally provided at the time of the customer's service order.

In connection with wireless emergency service calls, and again with reference to FIG. 1, the caller originates a 9-1-1 call from a mobile telephone 120 in communication with a radio tower or cellular base station 124. A mobile switching center (MSC) 128 queries a mobile positioning center (MPC) 132 for routing instructions. The MPC 132 requests the caller's location from a position determining entity (PDE) 136. Communications between the MSC 128, the MPC 132 and the PDE 136 may generally be performed over an SS7 signaling network 140. Once the MPC 132 has the position information from the PDE 136 it interrogates a coordinate routing database (CRDB) 144 to obtain the ESZ serving the caller. The MPC 132 uses this ESZ to fetch and assign routing digits or the emergency services routing key (ESRK). The MPC 132 passes this ESRK to the MSC 128, which then forwards the call to the interconnected emergency services E9-1-1 tandem 104 over an emergency services trunk line 148. The tandem 104 then forwards the call to the PSAP 112. Once the call is received at the PSAP 112, the PSAP 112 queries the ALI 116 system using the ESRK, and the ALI 116 forwards the query to the MPC 132. The MPC 132 returns the callback number, latitude, longitude and other pertinent information. Accordingly, a trunk line to the emergency services network is required. In addition, such systems are only applicable to the serving area of the E9-1-1 tandems to which the mobile switching center that received the call is interconnected by the trunk line. In particular, such systems are incapable of routing requests for emergency services from a central call center to an appropriate PSAP.

Figure 2:
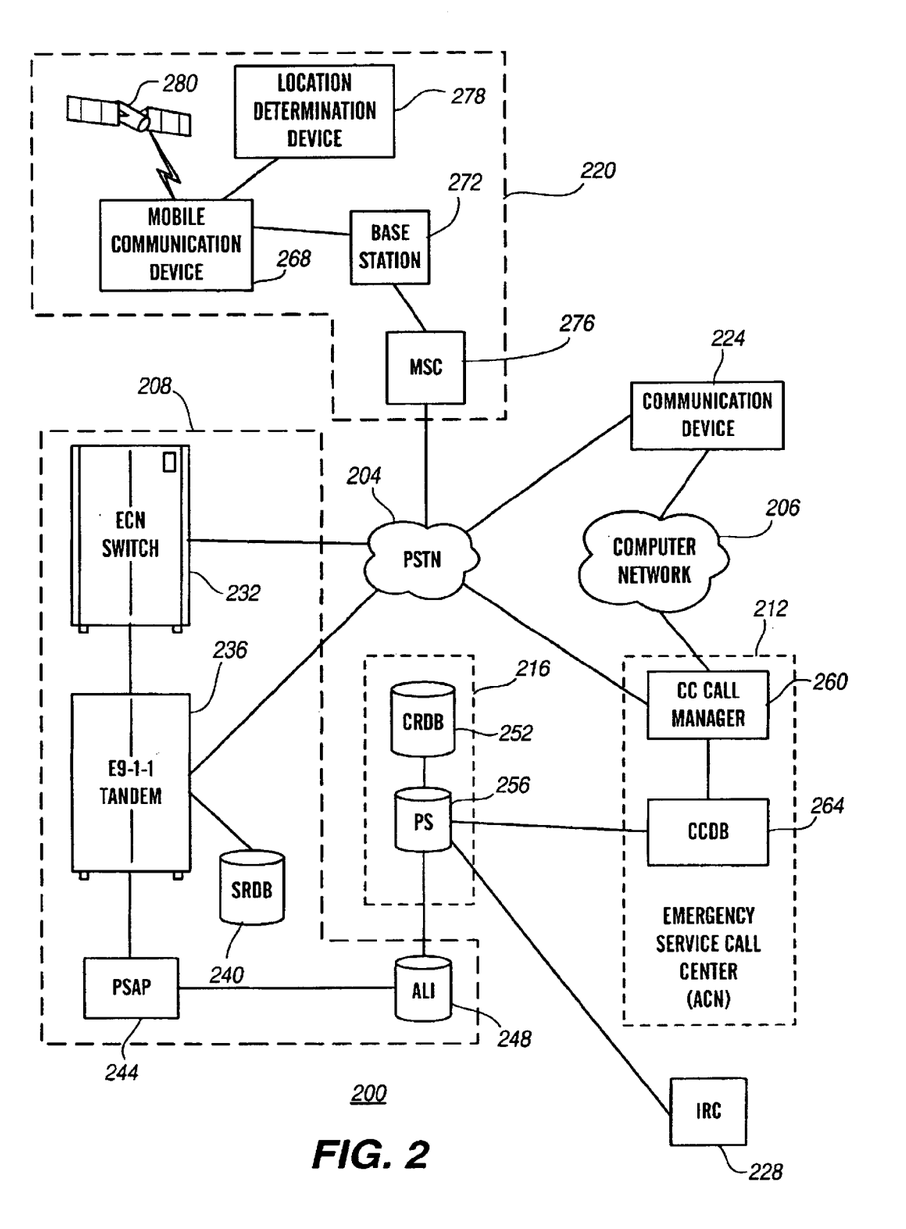
FIG. 2 depicts a network for delivering emergency services calls and data to a public safety answering point in accordance with an embodiment of the present invention.

With reference now to FIG. 2, a network 200 for delivering emergency service calls or request for emergency services in accordance with an embodiment of the present invention is depicted. In general, the network 200 includes the public switched telephone network 204, an emergency communications or services network 208, an emergency service call center 212, and an emergency services complex 216. In addition, the network 200 may include a mobile communication network 220. The network 200 may also include an emergency service communication device 224. As can be appreciated, an emergency service communication device 224 may include a premises alarm, a personal alarm, a VoIP telephone, or another communication device capable of initiating or conveying a request for emergency services to an emergency service call center 212. In addition, the emergency service network 200 may include an information retrieval center 228.

As can be appreciated by one of ordinary skill in the art, the public switched telephone network (PSTN) 204 generally includes various switches, for example, telephone company central office or local switches. The switches generally function to interconnect two or more communication devices. As can also be appreciated by one of skill in the art, in addition to delivering voice or other data, the public switched telephone network 204 comprises signaling networks, such as the SS7 network, which carry information used to properly route calls.

The emergency services network 208 may include an emergency communication network (ECN) switch 232 interconnecting the emergency communication network 208 to the public switched telephone network 204. The emergency communication network 208 additionally includes an E9-1-1 tandem (or tandem) 236 and an associated selective routing database (SRDB) 240. The emergency services network 208 also includes a public safety answering point (PSAP) 244 and an automatic location identification (ALI) database or system 248. Each public safety answering point 244 and automatic location identification database or system 248 associated with a network 200 may be considered to be a network node.

The emergency communication network switch 232 generally serves to interconnect the emergency services network 208 to the public switched telephone network 204. In particular, the emergency communication network switch 232 determines the appropriate E9-1-1 tandem 236 to which a call received from the public switched telephone network 204 should be routed. As will be described in greater detail below, the emergency communication network switch 232 uses an emergency services routing number (ESRN) associated with a call as the called number to determine the appropriate E9-1-1 tandem 236. In accordance with an embodiment of the present invention, the emergency communication network switch 232 then deletes the emergency services routing number, adds 9-1-1, and forwards the call to the appropriate E9-1-1 tandem 236. In particular, in the SS7 signaling initial address message (IAM), the emergency services query key is sent as the calling party number, and the digits 9-1-1 as the called party number. In accordance with another embodiment of the present invention, calls are routed directly to the appropriate E9-1-1 tandem 236, which is itself a type of switch, from the public switched telephone network 204, and no emergency communication network switch 232 need be provided.

The E9-1-1 tandem 236 is a network element that receives 9-1-1 calls from the emergency communication network switch 232, or from the public switched telephone network 204 directly. The E9-1-1 tandem 236 functions to locate the appropriate public safety answering point 244, and to deliver the call to the appropriate public safety answering point 244. The E9-1-1 tandem 236 determines the correct public safety answering point 244 by querying the selective routing database 240 using the emergency services query key received as the calling party number. The selective routing database 240 may be provided as part of the E9-1-1 tandem 236, as part of an automatic location identification database or system 248, or as a database implemented on another device in communication with the E9-1-1 tandem 236. The E9-1-1 tandem 236 receives an emergency service number identifying the emergency service zone covering the location of the calling party from the selective routing database 240, and correlates the emergency service number to a communication line or trunk associated with the appropriate public safety answering point 244. The E9-1-1 tandem 236 then delivers the call across the line or trunk, together with the emergency services query key.

The public safety answering point 244 receives emergency services calls from the E9-1-1 tandem 236. Upon delivery of the call to the public safety answering point 244, the public safety answering point 244 is placed in voice contact with the calling party. Accordingly, personnel associated with the public safety answering point 244 may communicate with the calling party. In order to obtain additional information that may be useful in connection with the handling of the call, the public safety answering point 244 queries the automatic location information database 248 for additional information.

In particular, the automatic location identification database 248 receives in connection with a query from the public safety answering point 244 an emergency services query key. The automatic location identification database 248 recognizes the emergency services query key as being within a range of numbers allocated to emergency service call center 212 calls. The automatic location identification database 248 then queries a positioning server 256, described in greater detail below, to retrieve information regarding the call. The information is then returned to the public safety answering point 244.

The information obtained through the automatic location information database may include the identity of the caller, the location of the caller, and information regarding the circumstances of the call. For example, information may include data concerning the severity of an automobile collision, the nature of a medical emergency, or the nature of an alarm. This additional information is provided to the public safety answering point 244 from the automatic location information database 248 over, for example, a computer network. The query of the automatic location information database 248 and the information received in reply may be communicated in accordance with protocols defined by the North American Emergency Numbering Association (NENA). In accordance with a further embodiment of the present invention, the query and information returns may be communicated according to an XML protocol.

The emergency services complex 216 generally includes a coordinate routing database (CRDB) 252 and the positioning server 256. In general, an emergency services complex 216 is established for a large geographic area. For example, one emergency services complex 216 may be operated in connection with requests for emergency services received from callers located anywhere in North America, or anywhere in the United States. The operation of a single emergency services complex 216 for such a large area facilitates the provision of emergency services to clients of emergency call centers 212 servicing similarly large areas. Of course, a multiplicity of emergency services complexes 216 may be associated with the network 200, for example where smaller geographic divisions of services are desired, or where different emergency services complexes 216 are established in connection with different emergency service call centers 212. As can be appreciated, mirror or backup emergency service call centers 216 may also be associated with the network 200 to provide redundancy.

The coordinate routing database 252 generally contains geographic information system (GIS) data relating to emergency service zone boundaries for the area covered by the emergency services complex 216. Accordingly, in response to provided location information, such as latitude and longitude information, the coordinate routing database 252 returns a corresponding emergency services zone. In accordance with an embodiment of the present invention, the coordinate routing database 252 performs a point-in-polygon lookup to find the point corresponding to the provided location information within a polygon related to the coverage area of a specific emergency service zone. The coordinate routing database 252 then outputs the emergency service zone.

The positioning server 256 generally receives client or caller information from the emergency service call center 212, and returns routing instructions to the emergency call center that allow the call to be routed to the appropriate public service access point 244 through the public switched telephone network 204. In particular, the positioning server 256 extracts location information, such as latitude and longitude information, received from the emergency service call center 212, and uses this information to query the coordinate routing database 252. The emergency service zone returned by the coordinate routing database 252 in response to the location information is then used to determine the emergency services routing number (ESRN) or telephone number associated with the target E9-1-1 tandem 236. The positioning server 256 also uses the emergency services zone to choose an identification key or emergency services query key (ESQK) that is available, that identifies the target PSAP and that will uniquely identify the request for emergency services or call for the duration of the call or for some period of time slightly longer than the estimated time of the call. The positioning server 256 may store ESRNs and available ESQKs in a table or tables. The ESRN and ESQK are returned to the emergency service call center 212. In addition, the positioning server 256 caches the client or caller information that was received from the emergency service call center 212 in anticipation of a query from the automatic location information system 248.

The emergency service call center 212 generally includes a call center call manager 260 and a call center database 264. The call center call manager 260 generally receives calls initiated by a client communication device 224 or mobile communication device 268. In accordance with an embodiment of the present invention, the emergency service call center 212 is interconnected to the public switched telephone network 204. The calls are routed to an agent or operator associated with the call center call manager 260 for handling. The operator may receive display information regarding the current emergency on a viewing screen. The display information may include, for example, the location of the emergency event, the type of emergency, the severity of a collision, the identity of the client, and the type of assistance required. In addition, the operator may be placed in voice communication with parties at the calling location. The call center call manager 260 may also be interconnected to a communication network other than the public switched telephone network 204. For example, the call center call manager 260 may be interconnected to a communication network comprising a computer network 206. The computer network 206 may comprise the Internet. Accordingly, the call center call manager 260 may receive, for example, voice over Internet protocol (VoIP) communications. Furthermore, the call center call manager 260 can provide automated recognition of emergency calls and initiate a lookup of routing instructions without intervention by a human operator. Each emergency service call center 212 associated with a network 200 may be considered a network node.

The call center database 264 contains pertinent client and incident information. Accordingly, static information such as client name, address, call back number, medical conditions, vehicle information or premises information may be included. In addition, the call center database 264 contains location information, for example in the form of the latitude and longitude of the communication device 224, 268 initiating the call. The location information may be pre-provisioned in the database 264, for example in the case of emergency services provided in connection with a premises alarm. Location information may also be entered into the database dynamically, for example at the time the call to the emergency service call center 212 is made. For example, location information provided by a global positioning system (GPS) receiver in an automobile involved in a collision may be received as part of a communication initiated by a mobile communication device 268 associated with the automobile, and stored in the call center database 264.

The call center database 264 of the emergency service call center 212 is generally in communication with the positioning server 256 of the emergency services complex 216. The communication link between the emergency service call center 212 and the emergency service complex 216 may be made over a computer network. The communication link may be in accordance with a specially developed protocol, such as the TRIXE interface developed by the assignee of the present invention. The communication link between the call center database 264 and the positioning server 256 allows the call center database 264 to provide location information to the positioning server 256, and to receive back the ESQK and ESRN that will then be returned to the call center call manager 260.

The mobile communication network 220 generally includes a mobile communication device 268, a communication base station 272, and a mobile switching center 276. In addition, the mobile communication network 220 may include location determination equipment 280.

The mobile communication device 268 may include a mobile telephone or a personal alarm device. In addition, the mobile communication device 268 may include a communication device associated with a vehicle such as an automobile, and that is capable of performing telematic functions instead of or in addition to voice communications. For example, information concerning the circumstances of a collision and various vehicle parameters may be transmitted by the mobile communication device 268.

The base station or cell site 272 is generally in wireless communication with the mobile communication device 268. As can be appreciated by those of skill in the art, a mobile communication network 220 typically contains a large number of base stations 272 to provide coverage to a large geographic area. As can also be appreciated, a base station 272 may include a communication satellite where, for example, the mobile communication device 268 comprises a satellite telephone. The mobile switching center 276 handles the routing of communications between a mobile communication device 268 and the public switched telephone network 204.

The mobile communication network 220 may additionally include one or more location determination devices or systems 278. For example, and as depicted in FIG. 2, the location determination devices 278 may operate in cooperation with satellites 280 and may comprise suitable receivers at the location of or associated with the mobile communication device 268. For example, a location determination device 278 may comprise a global positioning system receiver. In an example of such an embodiment, a mobile communication device 268 is associated with a GPS receiver that receives signals from a number of GPS satellites 280. These signals allow the receiver to determine its location. The location information may then be provided to the mobile communication device 268, for provision to the emergency service call center 212. As can be appreciated by one of skill in the art, information regarding the location of a mobile communication device can be obtained using methods other than a GPS receiver at the location of the mobile communication device 268. For example, technologies relying on triangulation of the mobile communication device 268 from a number of base stations 272 may be utilized. In addition, a caller associated with a mobile communication device 268 may provide location information that can be manually entered by emergency call center personnel into the call center database 264.

As can be appreciated, a plurality of mobile communication networks 220 may be associated with a network 200 in accordance with the present invention. For example, mobile communication networks 220 providing mobile communication capabilities across a region or country may be associated with the network 200.

In addition to mobile communication devices 268, requests for emergency services may be initiated by a communication device 224 that is not part of a mobile communication network 220. For example, a communication device 224 comprising a land line telephone or other device in communication with the public switched telephone network 204 may initiate a request for emergency services to an emergency service call center 212. As a particular example, a communication device 224 may be provided as part of a premises alarm having dial-up notification features of an alarm condition. As another example, a telephone or other communication device interconnected to the public switched telephone network 204 through a private branch exchange may comprise a communication device 224. In still a further example, a communication device 224 may communicate with an emergency service call center 212 through a communication network 206 other than the public switched telephone network 204. For example, a communication device 224 may comprise a VoIP telephone or soft telephone communicating over a communication network 206 comprising a computer network, such as the Internet. As still another example, the communication device 224 may communicate with an emergency service call center 212 over a communication network 206 comprising a radio telephone or satellite telephone network. In general, any type of communication device 224, 268 that is capable of initiating contact with an emergency service call center 212 may be associated with a network 200 in accordance with an embodiment of the present invention, and may trigger a request for emergency services placed to a public safety answering point 244, as will be described in greater detail below.

The network 200 may additionally include an information retrieval center (IRC) 228. The IRC may be operated by an authorized agency in connection with a query of the emergency services complex 216 for incident information. For example, queries may be generated regarding an incident in progress, regarding the history of a previous incident, or to generate reports and statistics regarding incidents. Furthermore, multiple information retrieval centers 228 may query the emergency services complex 216. For example, emergency service providers in various states or municipalities may query the emergency services complex 216 for incident information.

In general, the network 200 may be considered as including a number of nodes. These nodes may include a communication device 224, 268, a public safety answering point 244, an emergency service call center 212, and an emergency services complex 216.

Figure 3:
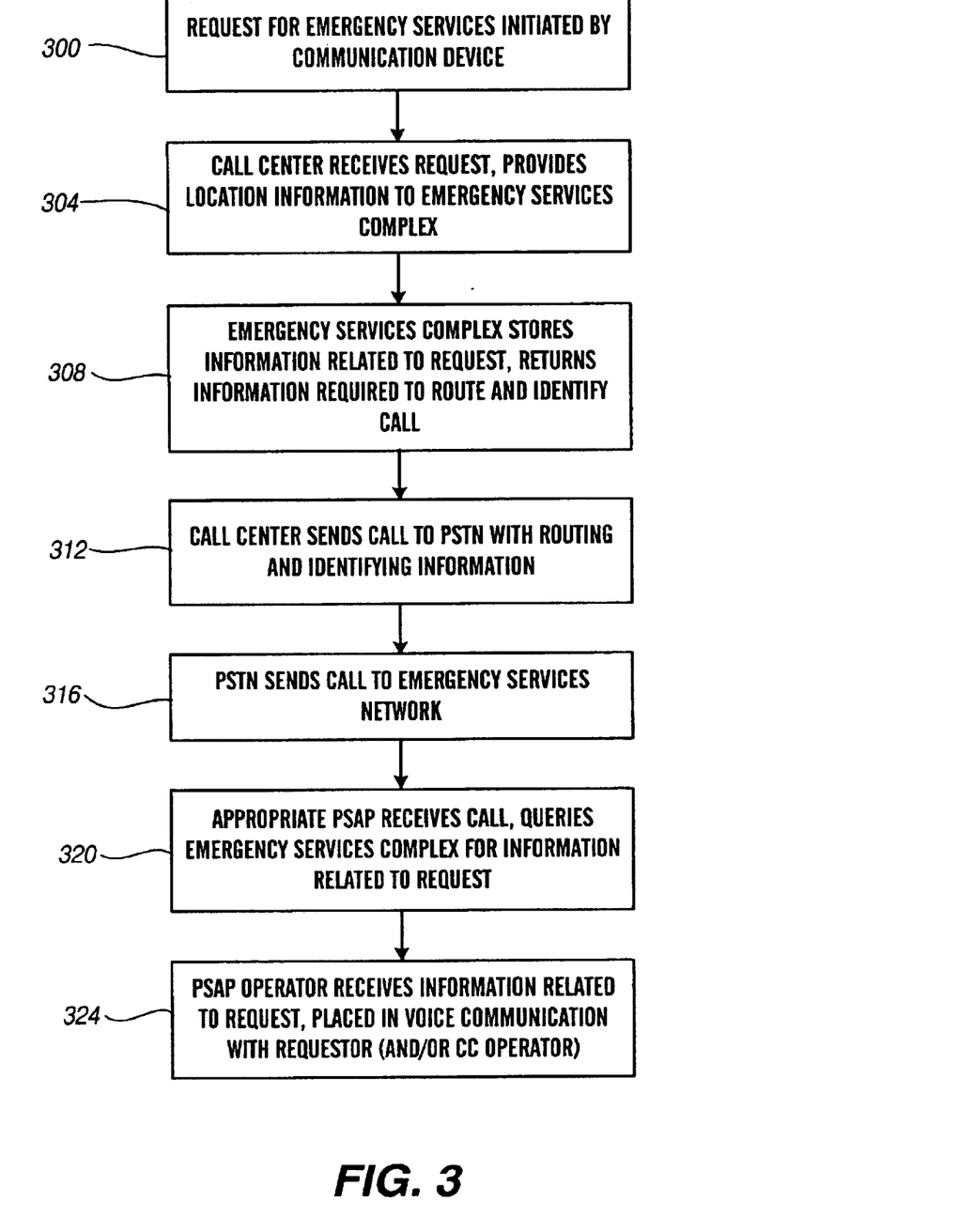
FIG. 3 is a flow chart depicting in overview the delivery of an emergency services call and data to a public safety answering point in accordance with an embodiment of the present invention.

With reference now to FIG. 3, an overview of the operation of a network 200 in accordance with an embodiment of the present invention is illustrated. Initially, at step 300, a request for emergency services is initiated by a communication device 224, 268. The request is made to an emergency service call center 212, rather than directly to an emergency services network. As an example, a mobile communication device 268 associated with an automobile involved in a collision may automatically initiate a request for emergency services over a mobile communication network. Alternatively, an occupant of a vehicle may initiate a request for emergency services to an automatic collision notification center using a mobile communication device 268. As a further example, a communication device 224 associated with a premises alarm may automatically initiate a request, or an occupant of the premises may use the communication device 224 to initiate a request over the public switched telephone network 204 to an alarm monitoring center. As still another example, a communication device 224 associated with a personal medical service, such as a personal alarm monitoring service, may initiate the request, either automatically or manually to an alarm monitoring center. As still a further example, a communication device 224 associated with a VoIP protocol network (e.g., computer network 206) may be operated to initiate the request to an emergency service call center 212.

At step 304, the emergency service call center 212 receives the request, and provides location information to the emergency services complex 216. In particular, the call center 212 receiving the request associates information regarding the request with the call. For example, a call center comprising an automatic collision notification call center may receive information from the communication device 268 regarding the nature of the emergency. In particular, a communication device 268 associated with a vehicle that is involved in a collision may provide information regarding the severity of the collision and the number of vehicle occupants. In addition, the call center 212 may receive information identifying the vehicle, and from that information may be able to provide from the call center database 264 preprovisioned information, such as the name of the vehicle owner, the make and model of the vehicle, and the color of the vehicle. In addition, location information may be provided by the communication device 268. For example, a GPS receiver associated with the communication device 268 may provide latitude and longitude information to the call center 212.

As a further example, the request for emergency services initiated by a communication device 224 associated with a premises alarm may provide information regarding the nature of the emergency and a client identifier identifying the communication device 224. The call center 212 receives the information regarding the nature of the emergency, and uses the information identifying the communication device 224 to identify the location of the premises, and information such as the owner and occupant of the premises from data stored in the call center database 264.

As still a further example, a request for emergency services initiated by a personal medical alarm may include identifying information such as a client identifier that allows the call center 212 to retrieve information from the call center database 264 regarding preexisting medical conditions. Accordingly, the information provided to the emergency services complex 216 by the call center 212 may, in addition to location information, include additional information to assist an emergency services provider in delivering needed services.

At step 308, the emergency services complex 216 stores information related to the request in the positioning server 256, and returns information required to route and identify the call and the stored information. In particular, the emergency services complex 216 uses the location information provided by the call center 212 to determine the emergency services routing number of the appropriate terminating emergency communication network switch 232 or 236 to receive the call, and assigns an emergency services query key to the call.

At step 312, the call center 212 sends the call to the public switched telephone network 204 with routing and identifying information. In particular, the emergency services routing number is used as the called party number to route the call across the public switched telephone network 204 to the appropriate emergency communications network switch 232 as a native request for emergency services (i.e. as a native 9-1-1 call). In addition, the identifying information (i.e. the emergency services query key) is provided as the calling party number to allow enhanced information to be provided to the public safety answering point operator, and to allow the call to be routed within the emergency service network, if necessary.

The public switched telephone network 204 then sends the call to the emergency services network 208 (step 316). In particular, the routing information received comprises a called number, which the public switched telephone network 204 may use to route the call. Furthermore, because the provision of a called number allows the call to be handled by the public switched telephone network 204 normally, the call can be routed to the appropriate emergency communication network switch 232, even though the emergency service call center 212 initiating or conferencing the call to a public safety answering point 244 across the public switched telephone network 204 is not within the serving area of the E9-1-1 tandem 236 associated with the appropriate public safety answering point 244. According to another embodiment of the present invention, the call is routed directly to the appropriate E9-1-1 tandem 236, without first being routed through an emergency communication network switch 232.

At step 320, the appropriate public safety answering point 244 receives the call and queries the emergency services complex 216 for information related to the request. Accordingly, information such as the identity of the caller, the nature of the emergency, and other enhancement information can be provided to a public safety answering point operator even though the request is placed or conferenced from an emergency service call center 212 that is itself located outside of the serving area covered by the public safety answering point 244.

At step 324, the public safety answering point operator receives the information related to the request, and is placed in voice communication with the requestor and/or an emergency service call center operator. For example, in connection with a vehicle collision, both the occupants of the vehicle with which the communication device 268 initiating the request is associated and an emergency service call center operator can engage in voice communications with the public safety answering point operator. As a further example, a request initiated in connection with a premises alarm may result in an emergency service call center operator being placed in voice communication with the public safety answering point operator, even if no one is present in the premises at the time the alarm is generated.

Figure 4A:
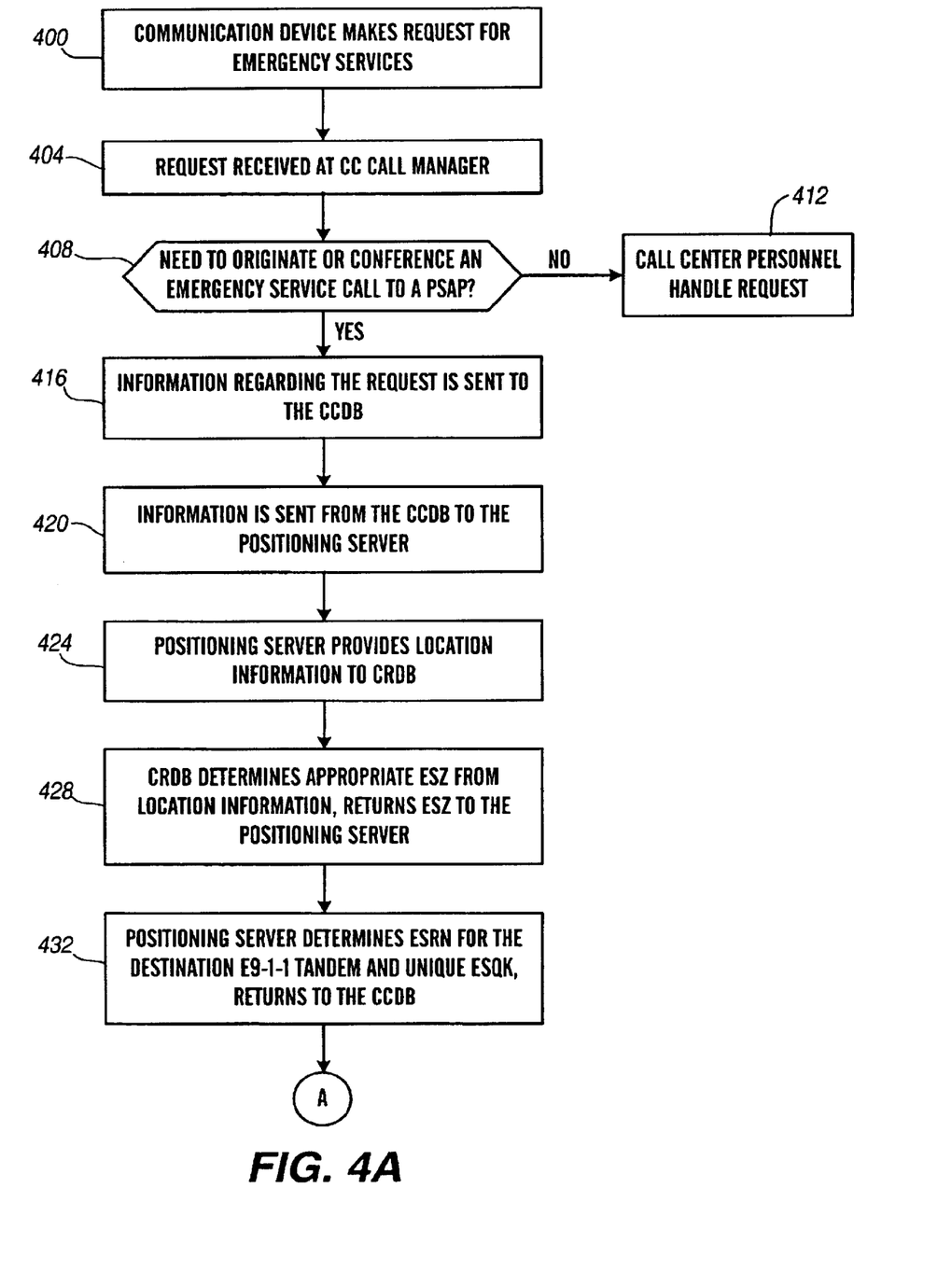
FIGS. 4A–C illustrate a flow chart depicting the delivery of an emergency services call and data to a public safety answering point in accordance with an embodiment of the present invention.
Figure 4B:
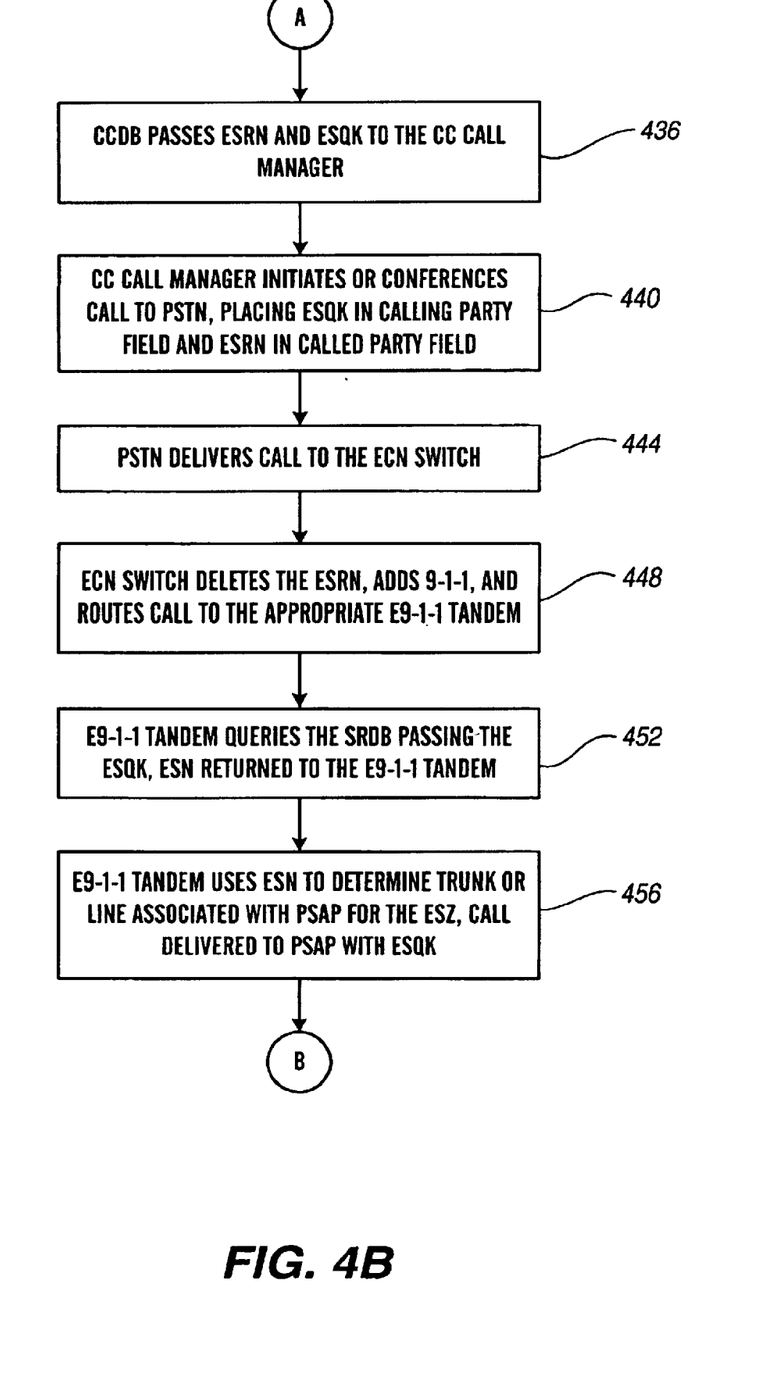
Figure 4C:
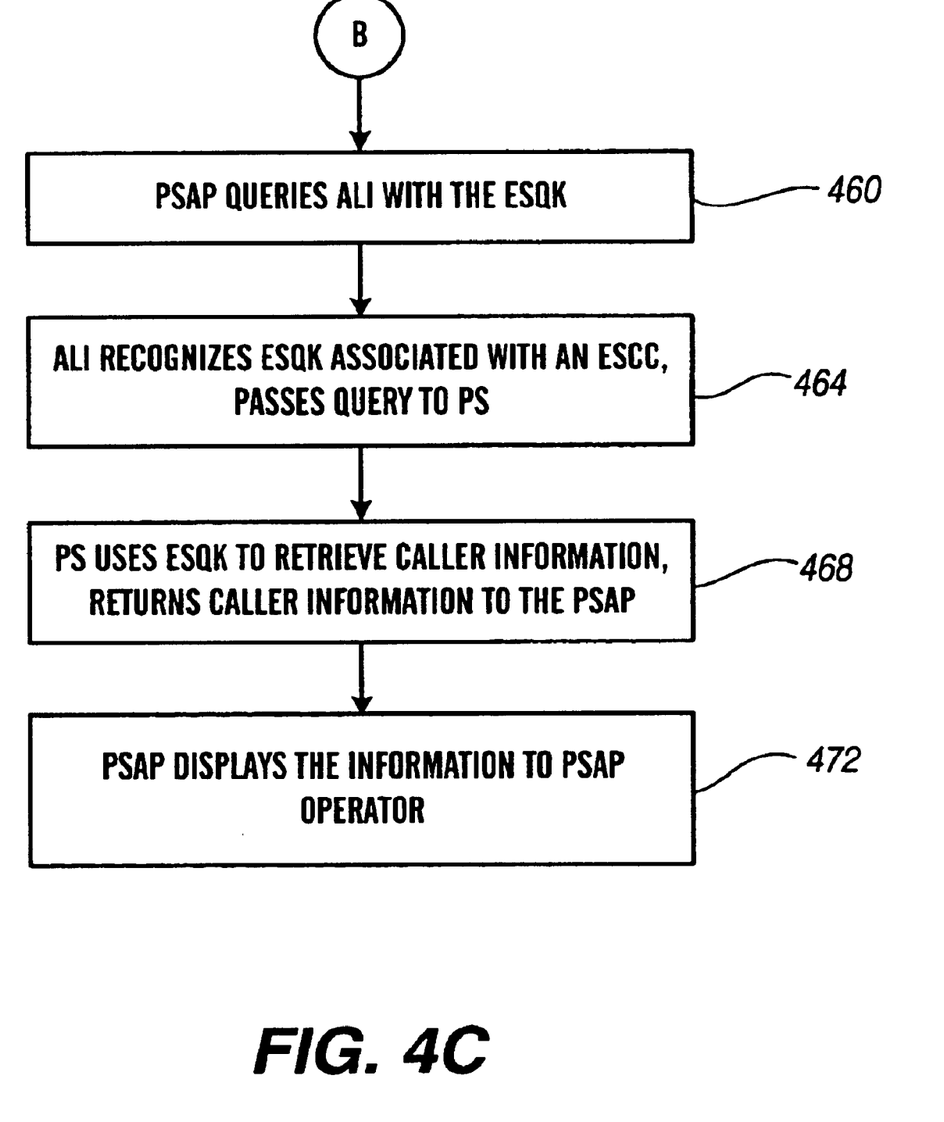

With reference now to FIGS. 4A–4C, the operation of a network 200 in accordance with an embodiment of the present invention is illustrated in greater detail. Initially, at step 400, a communication device 224, 268 makes a request for emergency services that is directed to an emergency services call center 212. The request is received at the call center call manager 260 of the emergency service call center 212 (step 404). At step 408, a determination is made as to whether there is a need to originate or conference an emergency service call to an appropriate public service answering point 244. If it is determined that there is no need to contact a public safety answering point 244, personnel associated with the emergency service call center 212 may handle the request (step 412). For example, in the case of a false alarm or where emergency service personnel have already reached the site of an accident, the request for emergency services may be terminated at the emergency service call center 212.

If it is determined that there is a need to originate or to conference an emergency service call to a public safety answering point 244, information regarding the request generated by or in connection with the communication device 224, 268 is sent from the call center call manager 260 to the call center database 264 (step 416). Information regarding the request may include the location of the communication device 224, 268, the names of persons associated with the communication device 224, 268, and the nature of the emergency.

At step 420, information regarding the request is sent from the call center database 264 to the positioning server 256 of the emergency services complex 216. The information includes caller location information, and may additionally include caller identification information. The location information may be obtained by the call center database 264 from coordinates provided from the communication device 224, 268. Alternatively, identification information associated with the voice communication device 224 is used to access location information stored in the call center database 264. The location information may be provided over a specially provided interface. For example, the location information may be provided over the TRIXE interface developed by the assignee of the present invention in the form of a latitude and longitude. In accordance with additional embodiments of the present invention, other coordinate systems may be used to identify the location of the communication device 224, 268.

The positioning server 256 next provides location information to the coordinate routing database 252 (step 424). For example, the positioning server 256 may provide the latitude and longitude of the communication device 224, 268 (i.e. of the caller) to the coordinate routing database 252. The coordinate routing database 252 then determines the appropriate emergency service zone from the location information, and returns the emergency service zone to the positioning server 256 (step 428). The appropriate emergency service zone may be determined by, for example, using input latitude and longitude information to do a point-in-polygon lookup to find the polygon related to a specific emergency service zone in which the communication device 224, 268 requesting emergency services is located.

From the emergency service zone returned by the coordinate routing database 252, the positioning server 256 determines the emergency services routing number for the destination E9-1-1 tandem 236 and a unique emergency services query key, which are returned to the call center database 264 (step 432). The emergency services routing number is utilized by the call center call manager 260 and the public switched telephone network 204 to route the call to the target E9-1-1 tandem 236. The emergency services query key uniquely identifies the request, and is used to route the call to the appropriate public safety answering point 244 and to provide call information to the public safety answering point 244. In addition, the emergency services query key may be selected from a range of numbers that identify a call as being placed in connection with an emergency service call center 212 to the servicing public safety answering point 244.

At step 436, the call center database 264 passes the ESRN and the ESQK to the call center call manager 260. The call center call manager 260 then initiates or conferences the call (i.e. the request for emergency service) to the public switched telephone network 204, placing the ESQK in the calling party field and the ESRN in the called party field of the signaling data associated with the call (step 440).

The public switched telephone network 204 then delivers the call to the emergency communication network switch 232 (step 444). The emergency communication network switch 232 deletes the ESRN, replacing the ESRN with 9-1-1 or the called number, and routes the call to the appropriate E9-1-1 tandem 236 (step 448). Alternatively, the ESRN routes the call directly to E9-1-1 tandem 236, and the E9-1-1 tandem classifies the call as an emergency call. The E9-1-1 tandem 236 then queries the selective routing database 240, passing the ESQK to the selective routing database 240 (step 452). The selective routing database 240 then returns the emergency service number assigned to the emergency services zone from which the request for service originated to the E9-1-1 tandem 236. The E9-1-1 tandem 236 uses the emergency service number (ESN) to determine the trunk or line associated with the public safety answering point 244 for the emergency service zone, and the call is delivered to that public safety answering point 244, together with the ESQK (step 456).

The public safety answering point 244, upon receipt of the call and the associated ESQK, queries the automatic location identification database 248 with the ESQK (step 460). The automatic location identification database 248 recognizes the ESQK as being associated with an emergency service call center 212, and passes the query to the positioning server 256 (step 464). The positioning server 256 uses the ESQK to retrieve caller information, and returns the caller information to the public safety answering point 244 (step 468). The public safety answering point 244 then displays the caller information to the public safety answering point operator handling the call (step 472).

As can further be appreciated, the various components described in connection with the network 200 need not be in close proximity to one another. For example, an emergency service call center 212 at one location may receive requests for emergency service from communication devices 224, 268 located anywhere within the United States. Additionally, the emergency services complex 216 may be at a first location, and may serve to determine appropriate emergency service zones for calls originating anywhere in the United States. As can further be appreciated, additional emergency service complexes 216 may be established for backup purposes.

The various components of the network 200 may be placed in communication with one another using a variety of communication networks or links. For example, as described above, voice communications may be transmitted, at least in part, over the public switched telephone network 204. In addition, data links may be established between the emergency communications network 208 and the emergency services complex 216. In addition, data links may be established between the emergency services complex 216 and the emergency service call center 212. These data links may utilize specially developed protocols to increase the efficiency of communications between the components of the network 200.

From the description given above, it can be appreciated that the present invention allows requests for emergency service that are initially handled by an emergency service call center 212 to be routed to a public safety answering point 244 as a native 9-1-1 call. In addition, the present invention allows the call to be routed to an appropriate public safety answering point 244, even though the request for service originates from anywhere within an area that encompasses a number of tandems 236. Furthermore, the present invention allows additional caller information to be associated with a request for service. The additional caller information may include information that is delivered visually to a public safety answering point operator, and may, in addition to identifying the caller, provide location information and information regarding the nature of the emergency.

The information retrieval center 228 may function to provide various information to emergency service providers or emergency service coordinating agencies. For example, information regarding requests for emergency service may be maintained in the emergency services complex 216. This information may be queried by the information retrieval center 228 regarding specific incidents, or regarding groups of incidents.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for routing emergency signals from a remote source, comprising:

generating in a communication device a signal requesting a response from an emergency service provider;

receiving from a public switched telephone network said signal requesting a response from an emergency service provider at an emergency service call center;

associating said communication device with a geographic location; querying an emergency services complex for information related to an emergency service zone corresponding to said geographic location of said communication device;

selecting an emergency services routing number, wherein said emergency services routing number comprises a telephone number designating a switch included in an emergency services network;

selecting an emergency services query key, wherein said emergency services query key comprises an identifier;

routing a telephone call from said emergency service call center to a public safety answering point; and querying said emergency services complex for information related to said communication device using said emergency services query key, wherein said information related to said communication device is returned to said public safety answering point.

2. The method of claim 1, wherein said signal generated in said communication device comprises a telephone call placed to said emergency service call center.

3. The method of claim 1, wherein information related to said geographic location of said communication device is provided to said emergency service call center as part of said signal generated by said conmunication device.

4. The method of claim 1, wherein said communication device is associated with a geographic location, wherein said information related to said geographic location of said communication device comprises a client identifier, and wherein said geographic location is obtained from a table associating said client identifier and said geographic location.

5. The method of claim 1, wherein said communication device comprises a mobile source.

6. The method of claim 1, wherein said communication device comprises a stationary source.

7. A system for geographically routing signals requesting emergency services, comprising:

a communication device, wherein said communication device is capable of generating a signal requesting emergency services;

a public safety answering point for responding to requests for assistance in a defined geographic area;

an emergency service call center, operable to receive said signal requesting emergency services from said communication device and to initiate a call to deliver said signal requesting emergency services to said public safety answering point;

an emergency services complex, operable to store data concerning a geographic location of said communication device and to correlate an emergency service zone to said geographic location of said communication device, wherein an emergency services routing number and an emergency services query key are associated with said signal requesting emergency services, and wherein said emergency services routing number comprises a called party number and said emergency services query key comprises a calling party number of said call to deliver said signal requesting emergency services initiated by said emergency service call center;

an emergency communications network switch, wherein said switch routes said signal requesting emergency services to at least one of a second emergency communications network switch and a public safety answering point having a geographic area that includes said geographic location of said communication device, wherein said emergency services query key is provided to an automatic location identification system, and wherein location information is returned to said public safety answering point.

8. The system of claim 7 wherein said communication device comprises a mobile communication device.

9. The system of claim 7 wherein said mobile communication device comprises a direct dial telephony device and a geographic location determining device.

10. The system of claim 7, wherein said communication device comprises a stationary communication device.

11. The system of claim 7, wherein said emergency service call center comprises human personnel and wherein said system places said call center personnel in communication with personnel located at said public safety answering point.

12. The system of claim 7, wherein said emergency service call center comprises an automated calling system.

13. The system of claim 7, wherein said emergency service call center comprises human personnel, and wherein said system places said call center personnel and persons at said geographic location of said remote source in communication with personnel located at said public safety answering point.

14. The system of claim 7, wherein said emergency services routing number comprises a telephone number designating a terminating emergency communications network switch.

15. The system of claim 7, said signal requesting emergency services generated by said communication device comprises a voice over Internet protocol signal.

* * * * *